United States Patent
D'Alo et al.

(10) Patent No.: US 7,490,323 B2
(45) Date of Patent: Feb. 10, 2009

(54) METHOD AND SYSTEM FOR MONITORING DISTRIBUTED APPLICATIONS ON-DEMAND

(75) Inventors: Salvatore D'Alo, Rome (IT); Alex Donatelli, Rome (IT); Claudio Marinelli, Aprilia (IT); Gianluca Bernardini, Guidonia (IT); Giulio Santoli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/892,433

(22) Filed: Jul. 15, 2004

(65) Prior Publication Data

US 2005/0198275 A1    Sep. 8, 2005

(30) Foreign Application Priority Data

Feb. 13, 2004    (EP)    .................... 04368011

(51) Int. Cl.
G06F 9/445 (2006.01)
G06F 9/46 (2006.01)
G06F 15/177 (2006.01)
G06F 15/173 (2006.01)

(52) U.S. Cl. ................ 717/178; 718/105; 709/221; 709/224; 709/226

(58) Field of Classification Search .............. 717/127, 717/168–178
See application file for complete search history.

(56) References Cited

U.S. PATENT DOCUMENTS

| 5,193,143 | A | * | 3/1993 | Kaemmerer et al. | .......... 706/45 |
| 5,787,409 | A | * | 7/1998 | Seiffert et al. | ................ 706/45 |
| 5,872,976 | A | * | 2/1999 | Yee et al. | .................... 717/127 |
| 5,889,953 | A | * | 3/1999 | Thebaut et al. | ............. 709/221 |
| 6,128,644 | A | * | 10/2000 | Nozaki | ...................... 709/203 |

(Continued)

OTHER PUBLICATIONS

Senger et al., "Load Distribution for Heterogeneous and Non-Dedicated Clusters Based on Dynamic Monitoring and Differentiated services", Sep. 2003, IEEE Internatiaonl Conference on Cluster Computering (Cluster'03), pp. 1-8.*

*Primary Examiner*—Tuan Q Dam
*Assistant Examiner*—Marina Lee
(74) *Attorney, Agent, or Firm*—Duke W. Yee; Jill A. Poimboeuf; Wayne P. Bailey

(57) ABSTRACT

A method (300;600) and system for monitoring distributed applications (for example, running on multiple WAS nodes of a cluster) is proposed. The solution of the invention is based on a self-adaptive resource management infrastructure. Particularly, an authority publishes (306-312) a plurality of rules, each one defining a desired target configuration for a category of subjects. A membership controller on each subject is responsible to assign (315-333) the subject to the respective category; a compliance engine then retrieves and applies (336-351) the rules corresponding to the category of the subject. The resource management infrastructure is used to implement a monitoring on-demand of the distributed application. For this purpose, two rules are defined (603-606) for the WAS nodes having the distributed application in a running condition and in a non-running condition, respectively. Each WAS node having the distributed application in the running condition applies (639-645) the first rule, so as to start the monitoring application; as soon as the distributed application switches to the non-running condition, the WAS node applies (654-657) the second rule, so as to stop the monitoring application automatically.

5 Claims, 11 Drawing Sheets

U.S. PATENT DOCUMENTS 6,978,452 B2 * 12/2005 Oesterreicher et al. ...... 717/171
7,296,268 B2 * 11/2007 Darling et al. .............. 718/105
2004/0031030 A1 * 2/2004 Kidder et al. ................ 717/172
2005/0138517 A1 * 6/2005 Monitzer ..................... 714/746

* cited by examiner

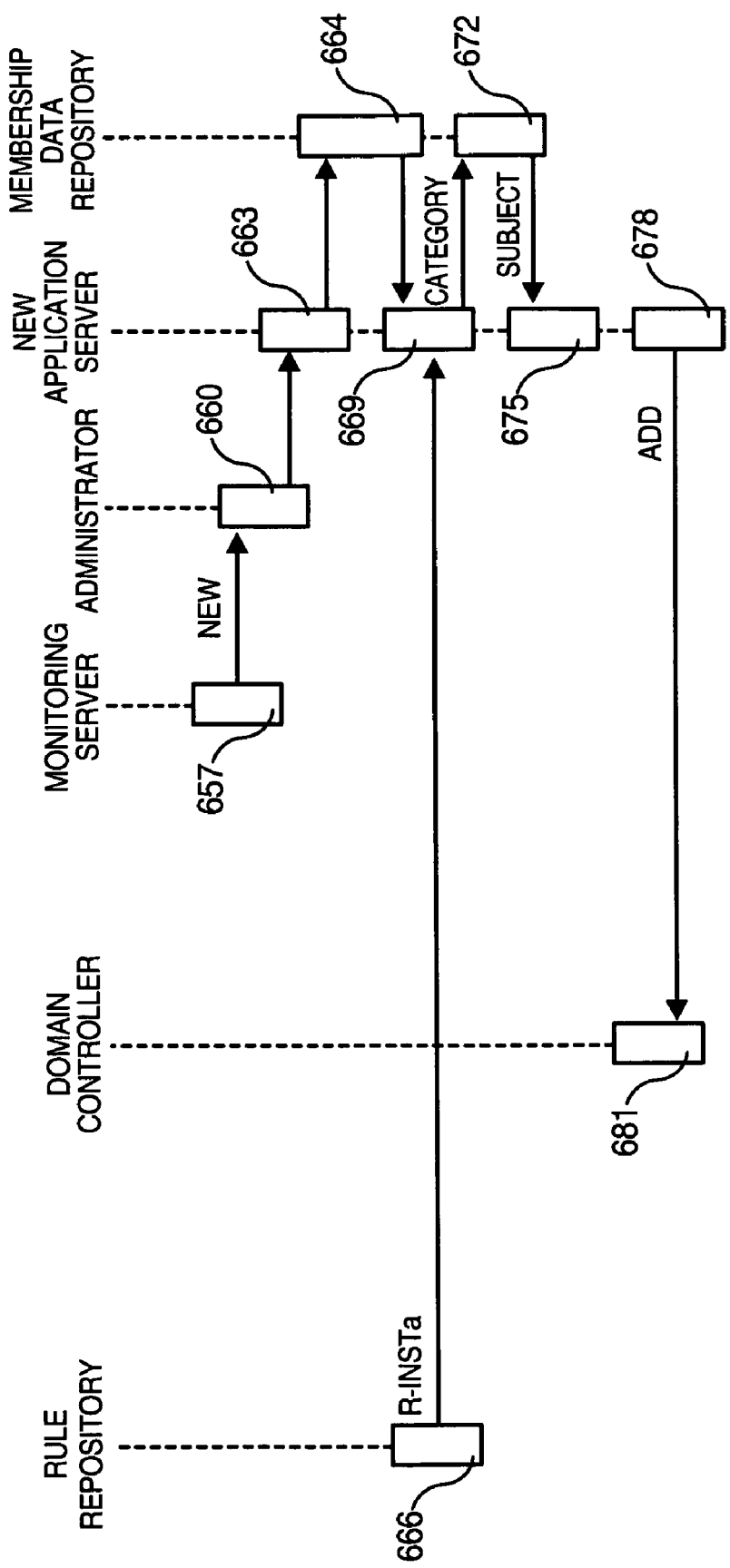

METHOD AND SYSTEM FOR MONITORING DISTRIBUTED APPLICATIONS ON-DEMAND

TECHNICAL FIELD

The present invention relates to the data processing field, and more specifically to a method and a corresponding system for monitoring distributed applications on-demand.

BACKGROUND ART

Distributed applications have become increasingly popular in the last years, particularly following the widespread diffusion of the Internet. In a distributed application, client computers exploit services offered by server computers across a network. The distributed application can be mirrored on multiple servers, which are grouped into a cluster. The cluster acts as a single logical entity, wherein each request received from the outside is automatically forwarded to the server in the cluster that is best suited to its handling. The clustering techniques provide high availability and parallel processing; moreover, load-balancing algorithms can be used in an attempt to optimize the distribution of the workload across the servers.

Tools for monitoring performance of distributed applications play a key role in their management. Particularly, a system administrator can get instantaneous notifications when a client is experiencing any problem (so that appropriate steps can be taken to remedy the situation); alternatively, the collected information can be logged and accurate counts tracked over time. For example, the information provided by the monitoring tools is essential for service level agreements or for threshold and/or availability control; moreover, the same information is very useful to measure the workload for capacity planning and charge-back accounting.

However, the solutions known in the art require that the monitoring tool should be installed and started individually on each server wherein the distributed application runs. This is a problem in high-dynamic environments, wherein the arrangement of the distributed application changes continually (so that very frequent interventions are necessary to keep the monitoring tool abreast of the configuration of the distributed application).

The problem is exacerbated when the configuration of the distributed application changes at run-time; for example, in a cluster the distributed application can be started and stopped on specific servers, according to the current workload of the cluster. In this condition, it is impossible to establish a priori the servers wherein the distributed application runs.

Therefore, the monitoring tool must be always running on all the servers of the cluster. However, the monitoring tool wastes processing resources, and then can adversely affect the performance of any other application running on the servers wherein the monitoring tool would not be necessary. As a consequence, the monitoring tool can be detrimental to the overall performance of the cluster, resulting in application delays and system overload.

Moreover, all the resource management infrastructures that can be used to control the above-described system (including the distributed application and the monitoring tool) are based on an enforcement model. In this model, the configuration of the system is entirely controlled by an authority residing at a central site. The authority defines a desired configuration of each entity included in the system. For this purpose, the authority accesses a central repository storing the (alleged) current configuration of each entity, and determines the management actions required to bring the entity to the desired configuration starting from its current configuration. The management actions are then enforced remotely by the authority on the entity (which is totally passive).

A drawback of the resource management infrastructures known in the art is the lack of any kind of cooperation between the authority and the entities. This lack of cooperation may lead to inconsistencies when the entities are upgraded out of the control of the authority. Moreover, in the solutions currently employed the management of entities that are temporarily unavailable or off-line is quite difficult to implement. The known resource management infrastructures also require the authority to maintain information about the location of all the entities; at the same time, the authority must handle the communication with every entity directly. The above-mentioned drawbacks strongly increase the difficulty of correctly defining a solution to be deployed in the system for implementing the monitoring of the distributed application.

SUMMARY OF THE INVENTION

It is an object of the present invention to implement a monitoring on-demand of the distributed application.

Particularly, it is an object of the present invention to facilitate the monitoring of the distributed application in high-dynamic environments.

It is another object of the present invention to provide a method for monitoring the distributed application efficiently when its configuration changes at run-time.

It is yet another object of the present invention to avoid running the monitoring application when it is not necessary.

The accomplishment of these and other related objects is achieved, in a data processing system including a plurality of processing entities, by a method of monitoring a distributed application suitable to run on at least one of the processing entities, the method including the steps of: surveying the processing entities to detect a change between a running condition and a non-running condition of the distributed application on each processing entity, enabling a monitoring application for the distributed application on the processing entities where a change to the running condition has been detected, and disabling the monitoring application on the processing entities where a change to the non-running condition has been detected.

The present invention also provides a computer program for performing the method and a product embodying the program.

Moreover, a corresponding system for monitoring a distributed application is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

FIGS. 6a-6b show an activity diagram illustrating an exemplary execution of a method for monitoring the distributed application on-demand.

DETAILED DESCRIPTION OF THE PREFERRED EMBODIMENT(S)

Figure 1A:
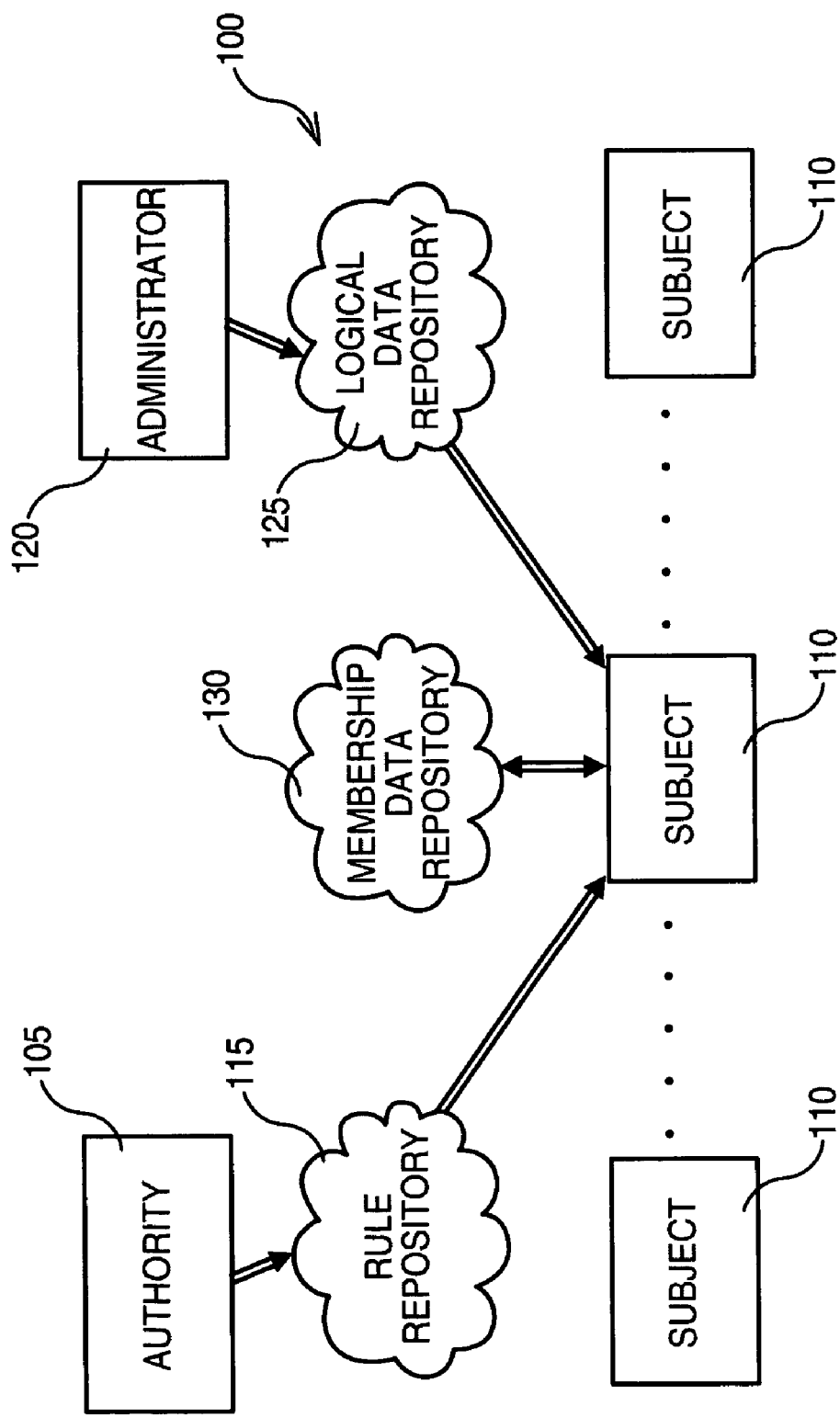
FIG. 1a is a schematic block diagram of a data processing system in which the method of the invention is applicable.

With reference in particular to FIG. 1a, a data processing system 100 with a distributed architecture (typically INTERNET-based) is shown. The system 100 includes a computer 105 operating as an authority; the authority 105 is responsible to define a desired configuration of the system 100. Multiple computers 110 operate as heterogeneous subjects, which directly control different instances of resources under management.

The authority 105 and the subjects 110 communicate in an associative way (at the information level). Particularly, the authority 105 publishes a set of rules (or laws) into a shared repository 115. Each rule specifies a desired configuration for a category of subjects 110, defined according to their logical and/or physical properties; particularly, the desired configuration is characterized by a target state of specific resources (which instances are controlled by the subjects belonging to the category specified in the rule). Moreover, the rule can include one or more formal parameters (or arguments); each formal parameter is used to define a logical correlation with another category dynamically (with the formal parameter that is resolved at run-time into the actual subject 110 belonging to the corresponding category when the rule is applied). The subjects 110 access the rule repository 115, in order to retrieve and apply the rules for their category.

A computer 120 operates as an administrator, which is responsible to define logical properties of the subjects 110 dynamically. The administrator publishes the corresponding information into a (shared) logical data repository 125, which is accessed by the subjects 110.

The subjects 110 communicate through an additional shared repository 130 (defining a virtual word implemented in the system 100). Each subject 110 publishes membership information indicating its category and the compliance with the corresponding rules into the repository 130; moreover, the subject 110 can access the membership data repository 130 to identify the subjects belonging to the category specified in any formal parameter (included in the rules to be applied on the subject 110).

The above-described repositories implement a peer-to-peer communication model, which totally decouples the different entities of the system 100 (authority 105, subjects 110 and administrator 120). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
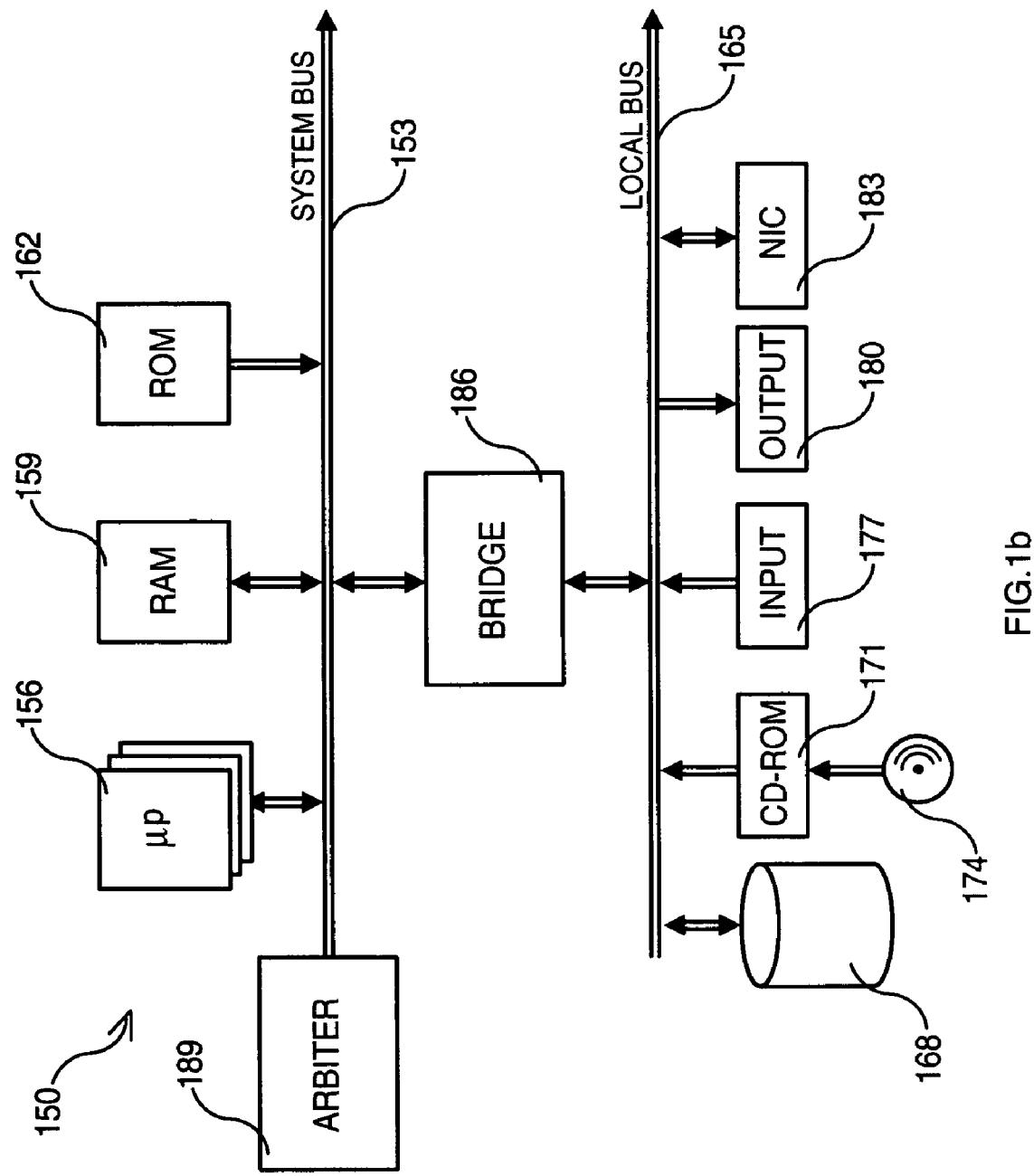
FIG. 1b shows the functional blocks of a generic computer of the system.

As shown in FIG. 1b, a generic computer of the system (authority, subject or administrator) is denoted with 150. The computer 150 is formed by several units that are connected in parallel to a system bus 153. In detail, one or more microprocessors (μP) 156 control operation of the computer 150; a RAM 159 (typically consisting of interleaved modules) is directly used as a shared working memory by the microprocessors 153, and a ROM 162 stores basic code for a bootstrap of the computer 150. Peripheral units are connected to a local bus 165 (by means of respective interfaces). Particularly, a mass memory consists of one or more hard-disks 168 and drivers 171 for reading CD-ROMs 174. Moreover, the computer 150 includes input devices 177 (for example, a keyboard and a mouse), and output devices 180 (for example, a monitor and a printer). A network Interface Card (NIC) 183 is used to connect the computer 150 to the INTERNET. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the data processing system has another architecture (for example, based on a LAN), or if different processing entities are envisaged (such as palmtops, cellular phones, and the like). Alternatively, two or more authorities and/or administrators are provided, or the authority and the administrator are grouped into a single entity; moreover, different repositories can be used for publishing the information about the categories of the subjects and the information about the compliance of the subjects with the corresponding rules, respectively, or two or more of the repositories can be consolidated into a single structure. In any case, the concepts of the present invention are also applicable when the computers have another structure or include equivalent units.

Figure 2A:
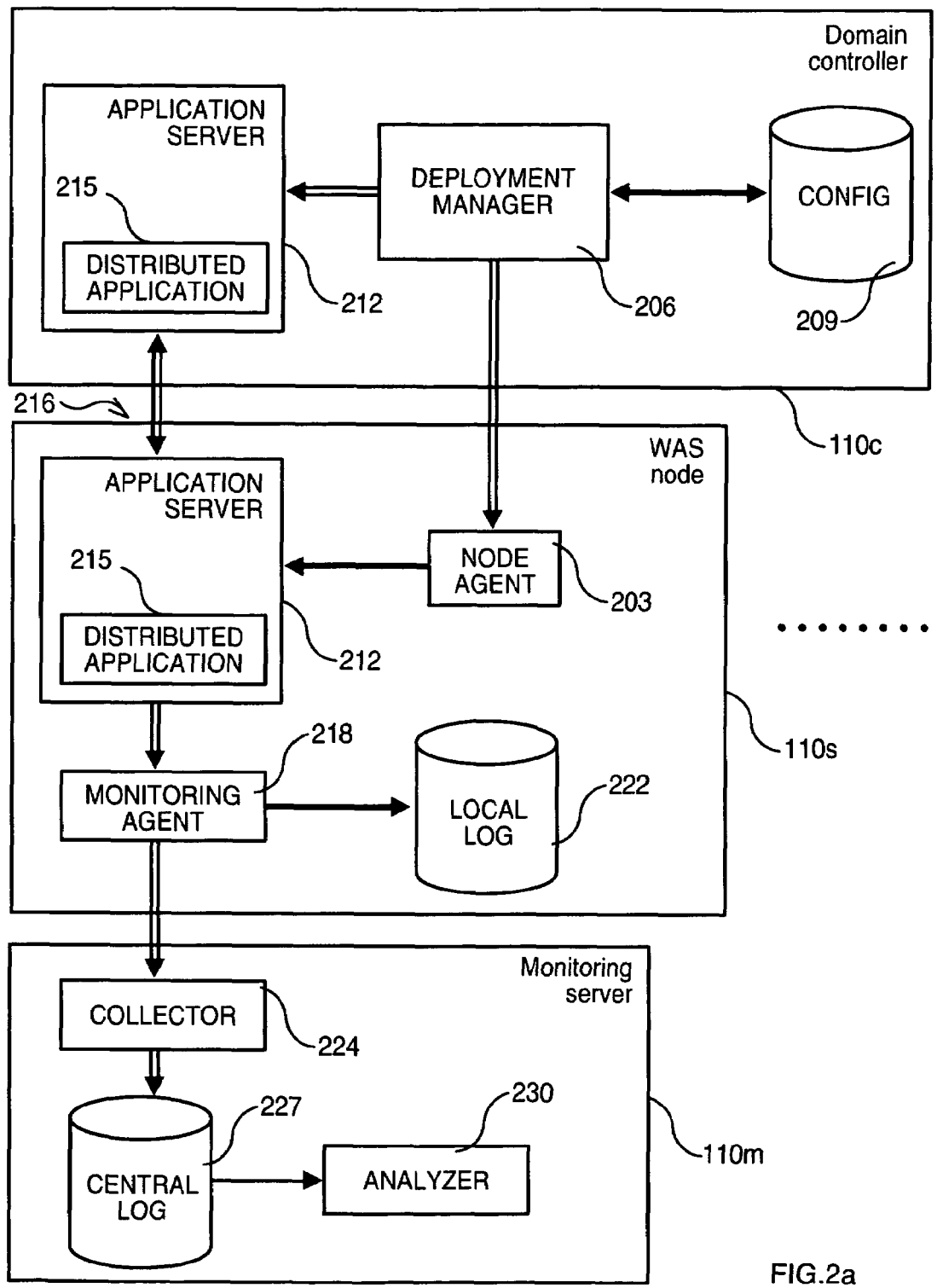
FIG. 2a illustrates the software architecture of an exemplary distributed application that is implemented in the system.

Considering now FIG. 2a, the software architecture of an exemplary distributed application that is implemented in the above-described system is illustrated. The information (programs and data) is typically stored on the different hard-disks and loaded (at least partially) into the corresponding working memories when the programs are running, together with an operating system and other application programs (not shown in the figure). The programs are initially installed onto the hard disks from CD-ROMs.

Particularly, a subset of the subjects are installed on nodes wherein Web Application Servers (WASs) reside. The WAS nodes are grouped into a cell; the cell is managed by a specific WAS node called domain controller (in the following, the domain controller will be denoted with 110c and the other WAS nodes will be denoted with 110s). For this purpose, a node agent 203 is installed on each WAS node 110c. The domain controller 110c includes a deployment manager 206, which interfaces with all the node agents 203, in order to control the configuration of the cell; information about the configuration of the cell is stored in a repository 209.

One ore more application servers 212 are installed on the domain controller 110c and on selected WAS nodes 110s of the cell; each application server 212 defines an operative environment for corresponding distributed software applications 215. The application servers 212 are grouped into one or more clusters 216. The deployment manager 206 controls the configuration of each cluster 216 (with the corresponding information that is stored in the repository 209); moreover, the deployment manager 206 installs each software application 215 and enforces its distribution to the other WAS nodes 110s (through the respective node agents 203); particularly, the deployment manager 206 can decide to install and start or to stop and remove the software application 215 on selected WAS nodes 110s according to a current workload of the cluster 216.

The cluster 216 is accessed through a dedicated server, not shown in the figure (for example, a HTTP server); the HTTP server distributes any request received from the outside across the application servers 212 of the WAS nodes 110s for their handling (according to load-balancing policies).

Each WAS node 110s further includes an agent 218 of a monitoring tool; the monitoring agent 218 measures performance parameters of each distributed application 215 (for example, the duration of any transaction); the performance parameters are then stored into a local log 222. As described in detail in the following, the proposed solution implements a monitoring on-demand of the distributed application 215; particularly, the monitoring agent 218 on each WAS node 110s is automatically started and stopped when the corresponding instance of the distributed application 215 is running or non-running, respectively. For this purpose, a rule is published by the authority for a category defined by the WAS nodes 110s wherein the distributed application 215 is running (which rule forces the starting of the monitoring agent 218), and a further rule is published for a category defined by the WAS nodes 110s wherein the distributed application 215 is not running (which rule forces the stopping of the monitoring agent 218).

Periodically (for example, every night), the performance parameters in the local log 222 are transmitted to a different subject acting as a monitoring server (denoted with 110m). The performance parameters of all the WAS nodes 110s are received by a collector 224, and then stored into a central log 227. An analyzer 230 accesses the central log 227, in order to identify any critical condition in the cluster 216; in response thereto, the analyzer 230 enforces a corresponding correction action on the cluster 216. For example, when the mean response time of the cluster 216 exceeds a threshold value a new WAS node 110s is added to the cluster 216. For this purpose, the analyzer 230 sets the category of a new subject as WAS node, so that the corresponding rules will cause the installation of the application server 212 and its inclusion into the desired cluster 216.

However, the concepts of the present invention are also applicable when the subjects implement a distributed application having a different architecture (for example, in a web farm with mirrored servers that are accessed through a router), or when a single instance of the distributed application runs on one or more predefined subjects (being moved to back-up subjects when those subjects are unavailable).

Moreover, similar considerations apply if the monitoring tool is replaced with an equivalent application. For example, different performance parameters can be measured, or the performance parameters can be aggregated before being logged; in addition, the performance parameters can be collected by the monitoring server directly when necessary, or the performance parameters can be simply available for viewing on each WAS node (without being transmitted to any monitoring server). Alternatively, the critical condition is defined in a different way (for example, when the distributed application is unavailable for a period longer than a preset value), or alternative correction actions are envisaged (for example, adding a number of new WAS nodes depending on the severity of the critical condition).

In any case, the provision of a function for removing one or more WAS nodes from the cluster is not excluded. For example, in an alternative embodiment the WAS node with the lowest exploitation of its resources is removed when the workload of the cluster falls below a threshold value.

Figure 2B:
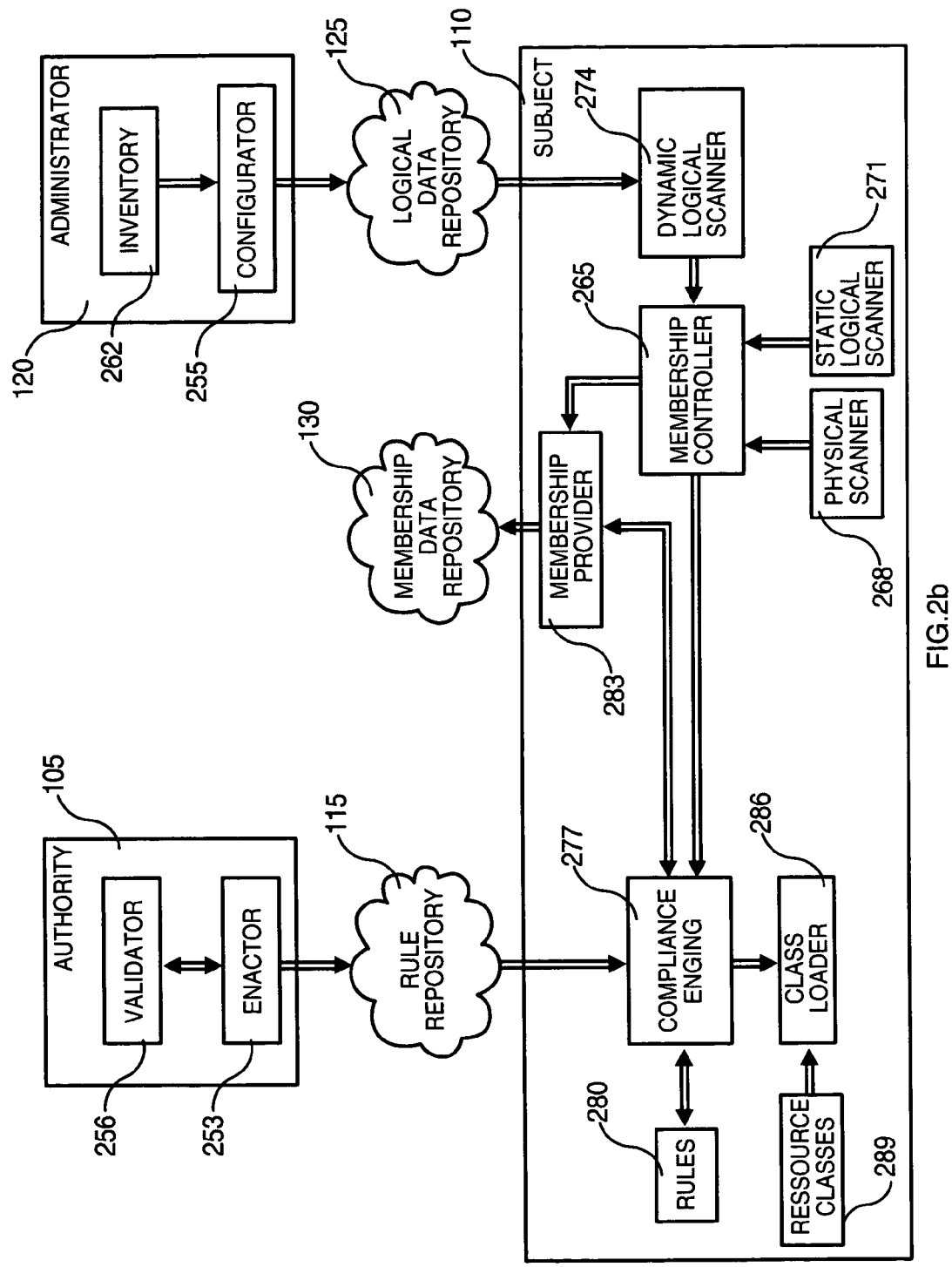
FIG. 2b depicts the main software components that can be used for managing the system.

Moving to FIG. 2b, the main software components that can be used to manage the above-described system are depicted.

Particularly, the authority 105 includes an enactor 253 for defining new rules implementing a desired solution to be deployed in the system. The enactor 253 interfaces with a validator 256, which checks the semantic correctness of each new rule; if the new rule is not in contrast to the other rules, the enactor 253 publishes the new rule into the corresponding repository 115.

With reference to the administrator 120, a configurator 255 is used to set the dynamic logical properties of the subjects 110 (which information is published into the corresponding repository 125). Those logical properties specify a current function of each subject 110 in the system (domain controller, WAS node, or monitoring server in the example at issue). For this purpose, the configurator 255 accesses an inventory 262 storing information about the organization of a company wherein the system is used.

Preferably, each repository (rule repository 115, logical data repository 125 and membership data repository 130) is implemented as a web application. Each subject 110 can register with any desired repository submitting a corresponding identifier (typically consisting of a Globally Unique Identifier, or GUID) and any other relevant information (such as its category).

Considering now a generic subject 110, a membership controller 265 is used to assign the subject 110 to the respective category (according to its logical and/or physical properties). For this purpose, the membership controller 265 cooperates with different plug-in scanners.

Particularly, a first scanner 268 assigns the subject 110 to a category defined according to its physical properties. For example, the physical category is specified by hardware characteristics (such as a hard-disk size, a CPU model, or a working memory capacity) and/or software characteristics (such as installed software programs or their running conditions). For this purpose, the physical scanner 268 leverages a hardware inventory explorer, a software inventory explorer and an application explorer (not shown in the figure).

A different scanner 271 statically assigns the subject 110 to a category defined according to its logical properties. For example, the static logical category specifies different groups of users (such as secretaries, managers, developers, system engineers) or different characteristics of physical entities (such as desktops, laptops, PDAs, mobile telephones); the static logical scanner 271 derives the category of the subject 110 from an identification code that is input during a login procedure or is hardwired.

Another scanner 274 assigns the subject 110 to a category defined according to its dynamic logical properties. For this purpose, the dynamic logical scanner 274 interfaces with the logical data repository 125.

A compliance engine 277 receives information identifying the category of the subject 110 (physical category, static logical category and/or dynamic logical category) from the membership controller 265. The compliance engine 277 retrieves the rules for the category of the subject 110 from the corresponding repository 115. The retrieved rules are stored into a log 280, which also includes a flag for each rule indicating whether the subject 110 is compliant or not with the rule.

The compliance engine 277 controls the application of the rules (stored in the log 280) on the subject 110. For this purpose, the compliance engine 277 leverages a membership provider 283, which accesses the membership data repository 130 to identify the subjects belonging to the category specified in any formal parameter (included in the rules to be applied on the subject 110). The compliance engine 277 further interfaces with a class loader 286, which is used to load the classes 289 controlling the resources under management on the subject 110 (from one or more repositories, not shown in the figure). Each resource class 289 owns a state catalogue, which specifies the current state of the corresponding resource. The resource class 289 further accesses a transition table; for each pair current state/target state, the transition table indicates one or more management actions required to bring the resource from the current state to the target state.

The membership provider 283 also receives the information specifying the category of the subject 110 from the membership controller 265; moreover, the membership provider 283 receives information indicating the compliance of the subject 110 with the corresponding rules from the compliance engine 277. The membership provider 283 publishes the information into the corresponding repository 130.

However, the concepts of the present invention are also applicable when the new rules are not validated by the authority, or when the shared repositories are implemented with different technologies. Alternatively, the categories are based on other characteristics of the subjects, the physical and/or logical characteristics of the subjects are detected in a different manner, or the categories are defined in another way (for example, with a different number and/or type of components, down to a single one).

In any case, the programs on the different computers and the corresponding data (described with reference to both FIG. 2*a* and FIG. 2*b*) can be structured in another way, different modules or functions can be provided, or the programs can be distributed on any other computer readable medium (such as a DVD).

Figure 3A:
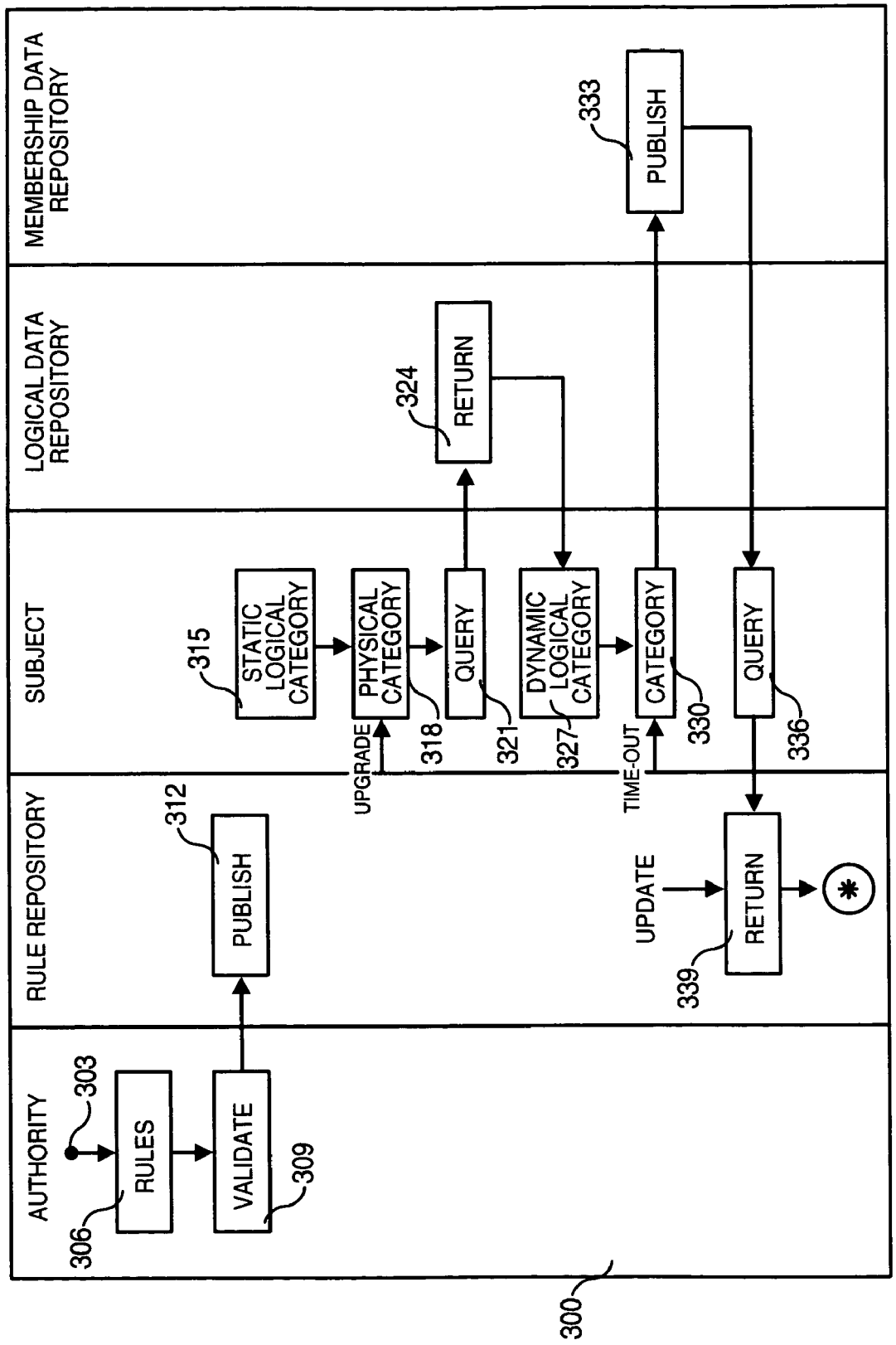
FIGS. 3a-3b show a diagram describing the flow of activities relating to a corresponding management method.
Figure 3B:
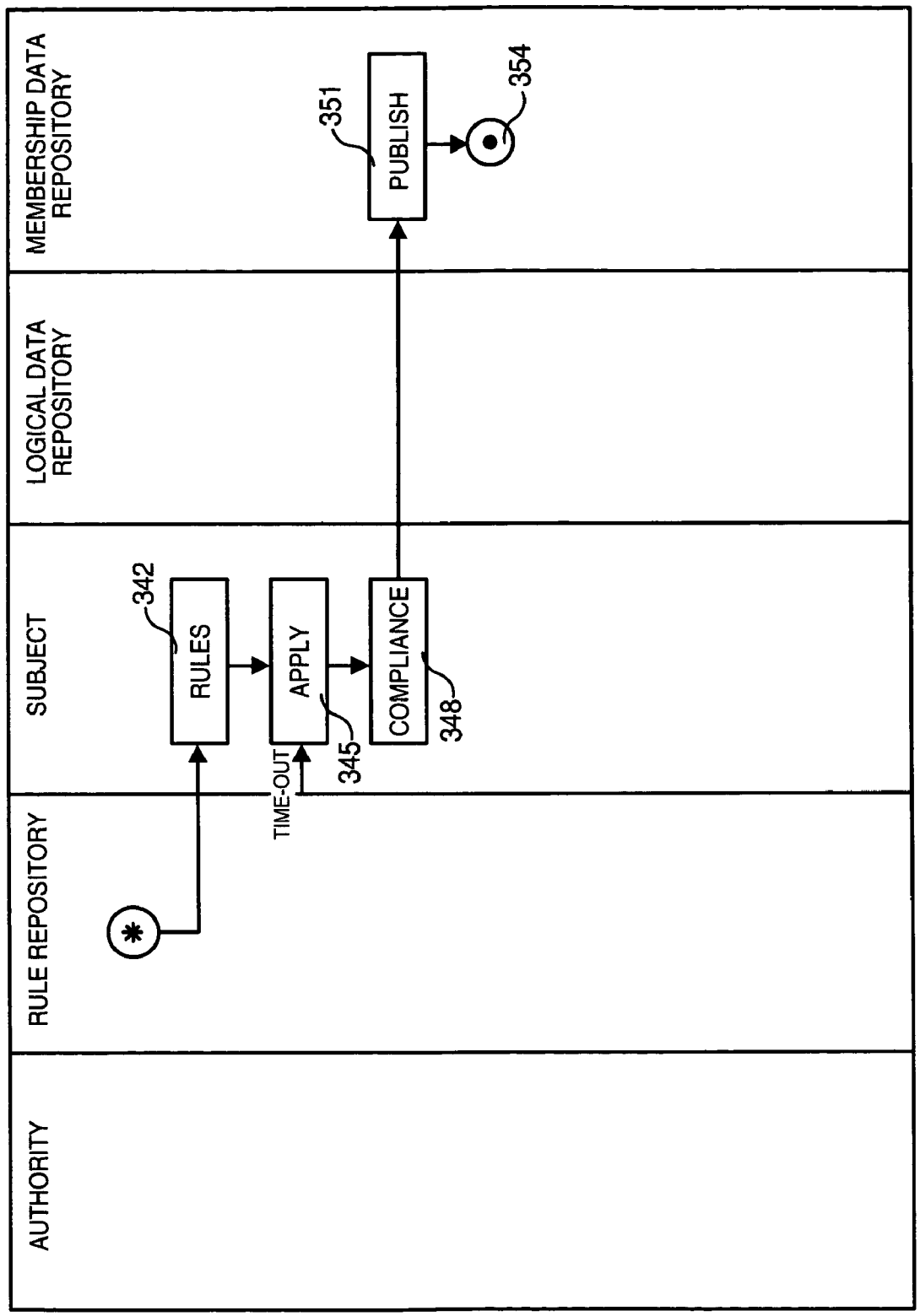

In the above-described resource management infrastructure, each subject self-adapts to the rules published by the authority. As shown in FIGS. 3*a*-3*b*, a corresponding process 300 begins at the black start circle 303 (in the swim-lane of the authority). Descending into block 306, the authority defines a set of new rules implementing the desired solution to be deployed in the system. The new rules are validated at block 309 for their semantic correctness. The new rules (if correct) are then published at block 312 into the corresponding repository.

The flow of activities continues to block 315 in the swim-lane of a generic subject; in this phase, the static logical category of the subject is derived from the identification code that is input during the login procedure or is hardwired. Hardware and software scans are then executed at block 318 (assuming that the rules for installing the corresponding components have already been applied), in order to detect the physical category of the subject; the same activities are also performed in response to the notification of a software and/or hardware upgrade carried out on the subject.

The process continues to block 321, wherein the subject queries the logical data repository in order to identify its dynamic logical category. Moving to block 324 in the swim-lane of the logical data repository, the desired information is retrieved and returned to the subject. The same point is also reached whenever updated information is published into the logical data repository for the subject (under the control of the administrator); in this way, the subject is promptly notified of any change in its dynamic logical category (assuming that the subject has previously registered with the logical data repository). Returning to the swim-lane of the subject, the category information is received from the logical data repository at block 327.

Considering now block 330, information identifying the category of the subject (static logical category, physical category and dynamic logical category) is supplied to the membership data repository. The same activity is also performed whenever a predetermined time-out expires (for example, every hour). If the category of the subject has changed, the information about the new category is published into the membership data repository at block 333.

The flow of activities continues to block 336, wherein the subject requests the rules for its category to the corresponding repository. Moving to the swim-lane of the rule repository, the desired rules are retrieved and returned to the subject at block 339, so as to implement a pull mode of operation. The same point is also reached whenever new rules are published for the category of the subject (under the control of the authority); in this way, the subject is promptly notified of any relevant new rule (assuming that the subject has previously registered with the rule repository), so as to implement a reactive mode of operation.

Returning to the swim-lane of the subject, the rules are received from the respective repository and logged at block 342. Considering now block 345, all the logged rules are applied on the subject (as described in detail in the following); the same activity is also performed whenever a predetermined time-out expires (for example, every day). In this way, the new rules are applied on the subject as soon as they are received; in addition, all the rules are periodically re-applied, so as to implement a healing mode of operation.

The flow of activities continues to block 348, wherein information about the compliance of the subject with the relevant rules is transmitted to the membership data repository. The information is published into the membership data repository at block 351. The method then ends at the concentric white/black stop circles 354.

Figure 4A:
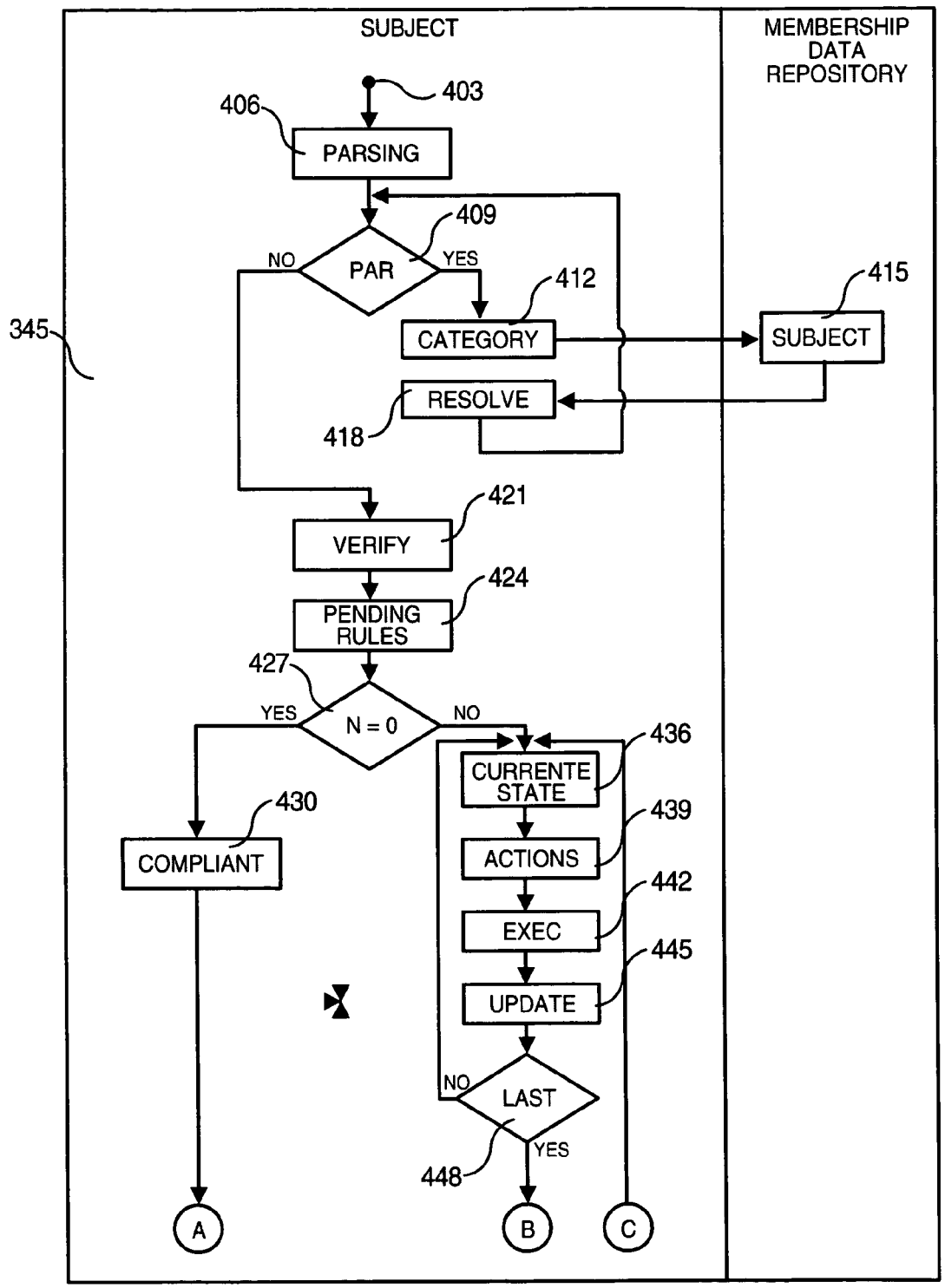
FIGS. 4a-4b detail a specific step of the method.
Figure 4B:
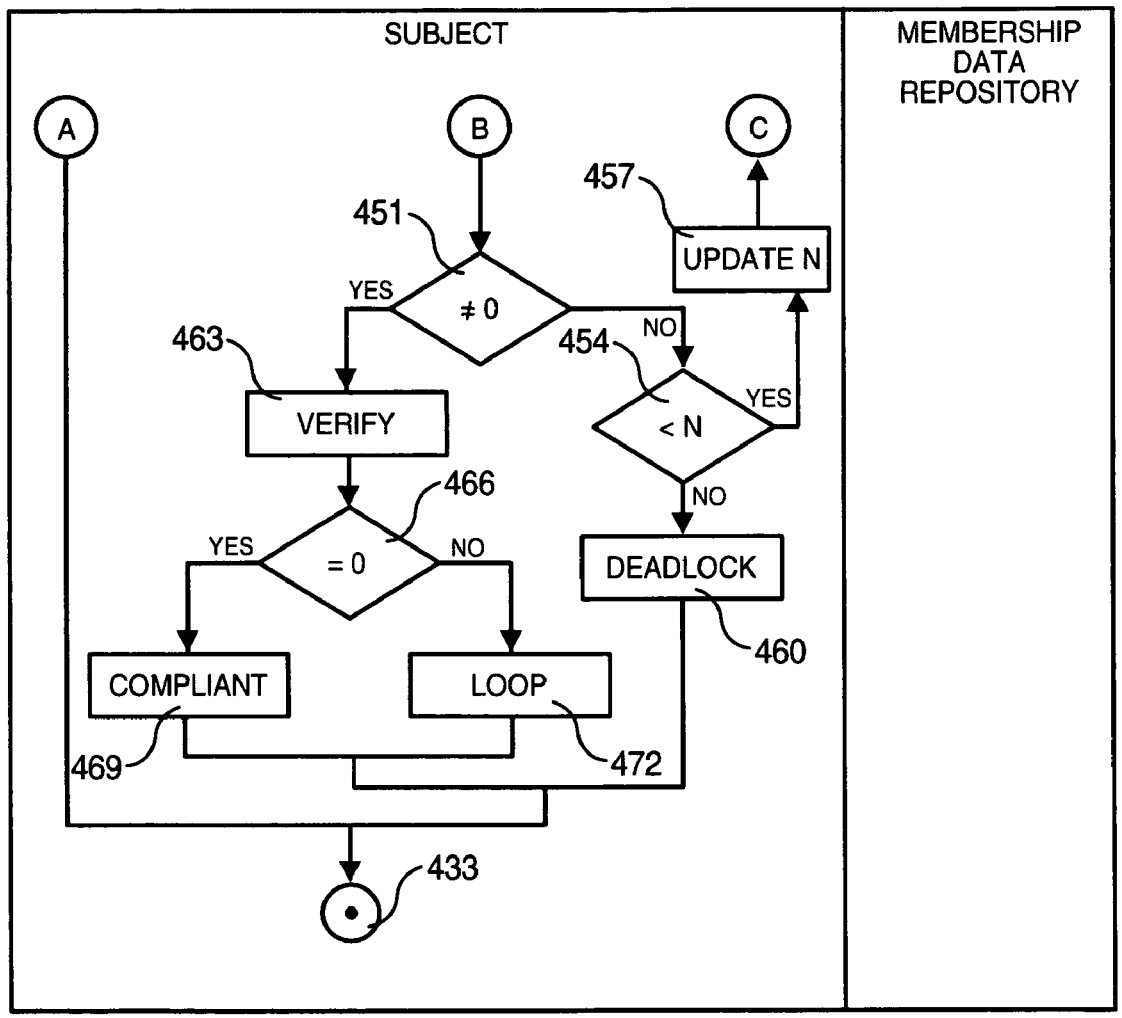

Moving now to FIGS. 4*a*-4*b*, the application of the rules on the subject implements a trail-and-fail process that expands the block 345 described above; this approach is able to resolve any dependencies among the management actions automatically. The process is executed whenever new rules for the subjects are retrieved from the respective repository (or whenever the corresponding time-out expires). Should the application of the rules be requested when the process is already in progress, its execution is aborted and a new process is started.

The flow of activities starts at block 403 in the swim-lane of the subject. Descending into block 406, the definition of the rule is parsed. Whenever a formal parameter is encountered (decision block 409), information about the subject belonging to the category specified in the formal parameter is requested to the membership data repository at block 412. In response thereto, the desired information is retrieved and returned to the subject at block 415. Referring now to block 418, the formal parameter is replaced by, or bound to, the subject returned by the membership data repository. Once the formal parameter has been resolved, the process returns to block 409 in order to continue the parsing of the definition of the rule. As soon as the parsing has been completed (i.e., all the formal parameters have been resolved or the rule does not include any formal parameter), the flow of activity descends into block 421.

Considering now block 421, the subject verifies whether the resource specified in each rule is already in the desired target state; if so, the compliance flag associated with the rule is set. At the same time, in the event of any inconsistency, the corresponding entry of the state catalog is updated accordingly; this feature is used by the subject to self-repair its configuration by restoring the correct target state of any resource (for example, when a file has been removed by mistake).

The method continues to block 424, wherein the number of pending rules with which the subject is not compliant (denoted with N) is saved. A test is then made at block 427 to verify whether the number of pending rules is zero. If so, the process passes to block 430, wherein a variable specifying the state of the subject is set to a value indicating its compliance with all the rules. The flow of activity then ends at the concentric white/black stop circles 433.

Returning to block 427, if the number of pending rules is greater than zero the process enters a loop at block 436; for each pending rule (starting from the first one), the current state of the corresponding resource is detected. Proceeding to block 439, a list of the actions needed to bring the resource to the target state (specified in the pending rule) from its current state is extracted from the corresponding transition table. The process continues to block 442, wherein the actions are executed on the subject. Considering now block 445, the entry of the state catalogue for the resource is updated accordingly. Moreover, if the application of the rule has been successful (bringing the resource to the desired target state) the corresponding compliance flag is set. The subject then verifies at block 448 whether the last pending rule has been processed. If not, the process returns to block 436 in order to execute the operations described above on a next pending rule.

As soon as all the pending rules have been processed, the flow of activity descends into block 451; a test is then made to determine whether the number of rules still pending is zero. If not, the subject verifies at block 454 whether the number of rules currently pending is lower than N (i.e., their number has decreased). If the result of the test is positive, the method continues to block 457 wherein the number of pending rules N is updated accordingly. The flow of activity then returns to block 436, in order to repeat the operations described above on the rules still to be applied.

Conversely, if the subject at block 454 determines that the number of pending rules has not decreased the process descends into block 460. In this condition, a deadlock is detected, since some pending rules are prevented from successfully bringing the corresponding resources to their target states; in response thereto, the state variable is set accordingly to a value indicative of the deadlock condition. The process then ends at the stop circles 433.

Referring back to block 451, if the number of pending rules is zero the flow of activity descends into block 463; for each rule, the subject verifies whether the resource specified in the rule is still in the desired target state; if not, the corresponding compliance flag is reset. The method then descends into decision block 466. If the subject determines that it is compliant with all the rules, the state variable is set accordingly at block 469. Conversely, if the subject is not compliant with one or more rules any longer an infinite loop is detected, since the application of some rules impairs the target state reached by the resources corresponding to other rules; the state variable is set accordingly at block 472 to a value indicative of the loop condition. In both cases, the process then ends at the stop circles 433.

Similar considerations apply if an equivalent process is executed or if additional functions are provided. However, the concepts of the present invention are also applicable when the subjects operate in another way (for example, only in the pull mode or only in the reactive mode), or when the application of the rules on the subjects involves different operations. For example, the administrator can enforce correction actions on non-compliant subjects, or the system can include one or more subjects operating as helpers for controlling the application of the rules on subjects that are not completely autonomous (for example, on mobile telephones).

Figure 5:
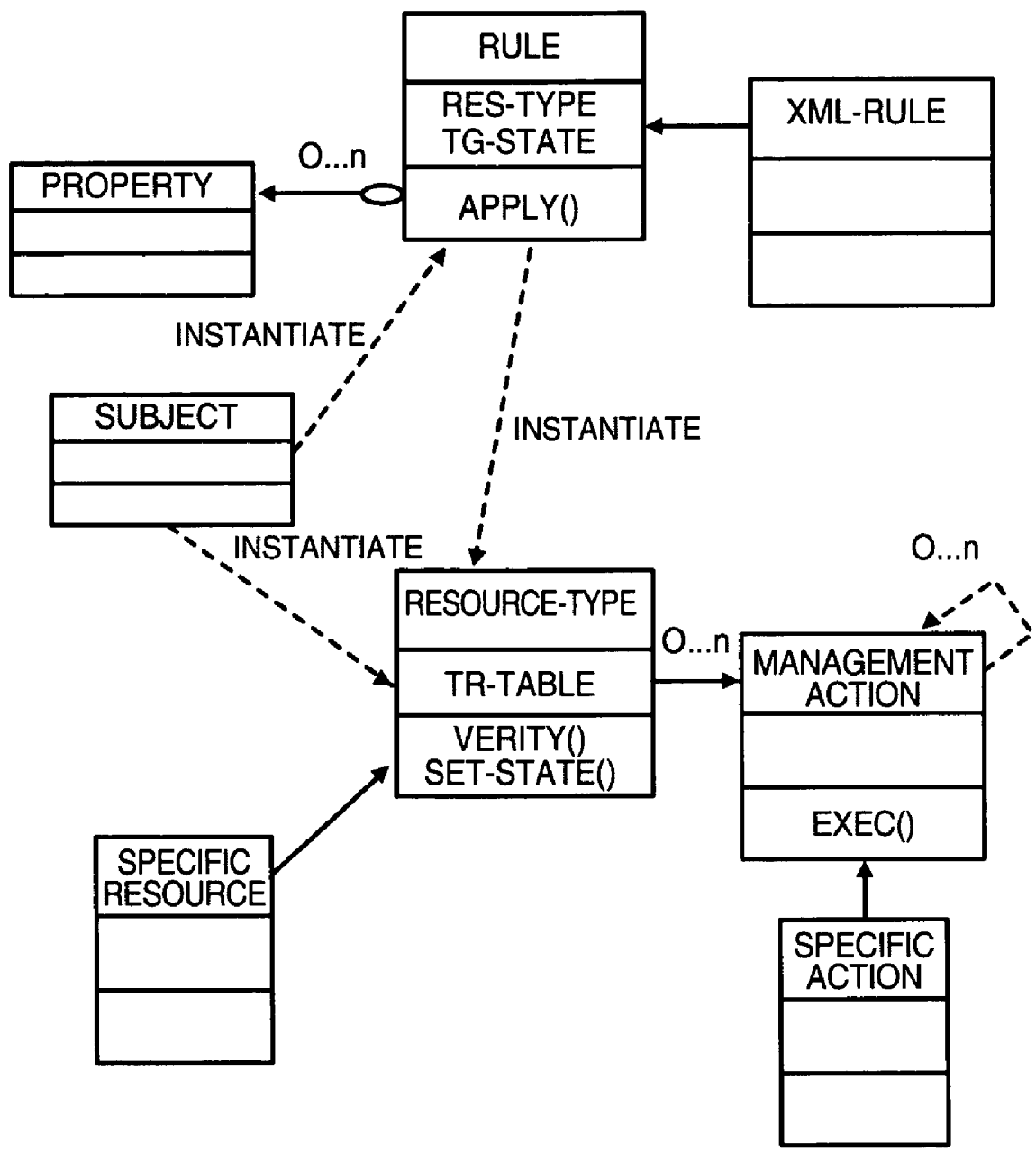
FIG. 5 depicts a class diagram implementing the method.

The resource management infrastructure is preferably implemented with a software application that is written in an object-oriented language (such as Java). As shown in FIG. 5, a corresponding class diagram includes a class "SUBJECT" (representing a generic subject in the system). The class "SUBJECT" instantiates objects of a class "RULE", which represents a generic rule published by the authority. The class "RULE" has a private attribute "RES_TYPE" (specifying the class name of the corresponding resource) and a private attribute "TG_STATE" (specifying the target state of the resource). Moreover, the class "RULE" exposes a public method "APPLY" for implementing the rule on the subject.

The class "RULE" has a collection consisting of any number of objects instantiating a class "PROPERTY"; each one of these objects includes additional information needed to apply the rule. A class "XML_RULE" extends the class "RULE"; the class "XML_RULE" defines an actual implementation of the rule in the XML language.

The class "RULE" and the class "SUBJECT" instantiate objects implementing an interface "RESOURCE_TYPE", which represents a generic resource under management. The interface "RESOURCE_TYPE" declares an abstract attribute "TR_TABLE" for the corresponding transition table; moreover, the interface "RESOURCE_TYPE" exposes a public method "VERIFY" (for validating the state of the resource) and a public method "SET_STATE" (for bringing the resource to the desired target state).

The interface "RESOURCE_TYPE" is implemented by concrete classes generically denoted as "SPECIFIC_RESOURCE", each one corresponding to a different type of resource (such as a file, a directory, a software package, a monitoring activity, and so on). Each class "SPECIFIC_RESOURCE" defines the content of the transition table in the attribute "TR_TABLE".

The interface "RESOURCE_TYPE" is further associated with any number of objects implementing an interface "MANAGEMENT_ACTION" (which in turn is recursively associated with itself). The interface "MANAGEMENT_ACTION" exposes a public method "EXEC" (for performing the required operations on the subject).

The interface "MANAGEMENT_ACTION" is implemented by concrete classes generically denoted as "SPECIFIC_ACTION", each one corresponding to a different type of management action (such as add, remove or change the attributes of a file/directory, install, remove or restore a software package, trigger or stop a monitoring activity, and so on). Each class "SPECIFIC_ACTION" actually defines the method "EXEC".

The application of a generic rule involves the instantiation of an object of the type "XML_RULE" (passing the corresponding XML definition as a parameter), followed by the calling of the method "APPLY". The method "APPLY" instantiates an object of the type "SPECIFIC_RESOURCE" (whose name is stored in the attribute "RES_TYPE").

The verification of the compliance of the subject with the rule (at the beginning and at the end of the application of all the rules) is carried out calling the method "VERIFY". The actual application of the rule starts with the calling of the method "SET_STATE" on the object of the type "SPECIFIC_RESOURCE" (passing the target state stored in the attribute "TG_STATE" as a parameter). The method "SET_STATE" determines the current state of the resource and then queries the transition table (stored in the attribute "TR_TABLE"), in order to determine the management actions required to bring the resource to the target state from its current state. One or more objects of the corresponding type "SPECIFIC_ACTION" are instantiated, and the method "EXEC" is called on every one of them.

Similar considerations apply if other classes, interfaces, attributes and/or methods are envisaged. However, the concepts of the present invention are also applicable when the software application implementing the resource management infrastructure is written in a different language (even non object-oriented).

A suggested grammar that can be used for defining the rules is described in the following. Each rule starts with a <LAW> tag and ends with a </LAW> tag. The rule includes a WHO clause (which is enclosed between the tags <WHO> and </WHO>), and a WHAT clause (which is enclosed between the tags <WHAT> and </WHAT>).

The WHO clause defines the category associated with the rule. The category is specified by means of one or more key/value pairs (each one for a corresponding category component); the category components can be combined with standard logic operators (such as AND, OR, NOT, and the like).

The WHAT clause describes the resource to be configured by the rule. In detail, the resource is defined between the tags <RESOURCE_DEFINITION> and </RESOURCE_DEFINITION>; for example, the rule specifies a type of the resource (enclosed between the tags <RESOURCE_TYPE> and </RESOURCE_TYPE>), a repository from which corresponding software components can be downloaded (enclosed between the tags <RESOURCE_REPOSITORY> and </RESOURCE_REPOSITORY>), the name of its class (enclosed between the tags <RESOURCE_CLASS> and </RESOURCE_CLASS>), the identification of a specific instance of the resource (enclosed between the tags <RESOURCE_INSTANCE> and </RESOURCE_INSTANCE>), and the like. The target state of the resource under management is defined between the tags <DESIRED_STATE> and </DESIRED_STATE>. Any argument of the rule is enclosed between the tags <ARGUMENT> and </ARGUMENT>. The arguments can include one or more formal parameters to be resolved at run-time; each formal parameter consists of the name of an operational feature preceded by the symbol "$", which name is followed by a dot and an expression identifying a category.

The above-described management infrastructure is well suited to implement the proposed monitoring on-demand of the distributed application. The corresponding solution to be deployed in the system can be defined by the following set of rules (assuming that the cluster has already been set up). Particularly, a rule R_INSTa is used to install and start a desired distributed application ("MyApplication") in the cluster:

```
<LAW>
    <WHO>
        MachineFunction==DomainController
    </WHO>
    <WHAT>
        <RESOURCE_DEFINITION>
            <RESOURCE_INSTANCE>MyApplication</RESOURCE_INSTANCE>
        </RESOURCE_DEFINITION>
        <DESIRED_STATE>Installed</DESIRED_STATE>
    </WHAT>
</LAW>
```

The rule R_INSTa applies to each subject classified as domain controller (i.e., which dynamic logical property "MachineFunction" is equal to "DomainController"); the rule R_INSTa forces the domain controller to deploy the distributed application "MyApplication" to all the WAS nodes of the cluster.

Two rules R_STARTm and R_STOPm then control the running of the monitoring agent ("MyMonitor") according to the state of the distributed application "MyApplication". Particularly, the rule R_STARTm forces the installation and the starting of the monitoring agent "MyMonitor" on each WAS node wherein the distributed application "MyApplication" is running:

```
<LAW>
    <WHO>
        MyApplication==Running
    </WHO>
    <WHAT>
        <RESOURCE_DEFINITION>
            <RESOURCE_INSTANCE>MyMonitor</RESOURCE_INSTANCE>
        </RESOURCE_DEFINITION>
        <DESIRED_STATE>Running</DESIRED_STATE>
    </WHAT>
</LAW>
```

Conversely, the rule R_STOPm forces the stopping and the removal of the monitoring agent "MyMonitor" on each WAS node wherein the distributed application "MyApplication" is not running:

```
<LAW>
    <WHO>
        NOT (MyApplication==Running)
    </WHO>
    <WHAT>
        <RESOURCE_DEFINITION>
            <RESOURCE_INSTANCE>MyMonitor</RESOURCE_INSTANCE>
        </RESOURCE_DEFINITION>
        <DESIRED_STATE>NOT Running</DESIRED_STATE>
    </WHAT>
</LAW>
```

The proposed monitoring on-demand solution includes further rules for adding new WAS nodes to the cluster, in response to the detection of any critical condition by the monitoring server. Particularly, a rule R_INSTs is used to install the application server onto each WAS node:

```
<LAW>
    <WHO>
        MachineFunction==WASnode
    </WHO>
    <WHAT>
        <RESOURCE_DEFINITION>
            <RESOURCE_INSTANCE>
                ApplicationServer
            </RESOURCE_INSTANCE>
        </RESOURCE_DEFINITION>
        <DESIRED_STATE>Installed</DESIRED_STATE>
        <ARGUMENT>
            $DomainController.(MachineFunction==DomainController)
        </ARGUMENT>
    </WHAT>
</LAW>
```

The formal parameter $DomainController is used to configure the WAS node to be associated with the subject acting as Domain Controller (which subject is determined at run-time resolving the formal parameter $DomainController into the subject having the dynamic logical property "MachineFunction" equal to "DomainController").

A further rule R_CONFIGc forces each domain controller to be reconfigured, in order to insert the application servers of any new WAS node into the desired cluster ("MyCluster"):

```
<LAW>
    <WHO>
        MachineFunction==DomainController
    </WHO>
    <WHAT>
        <RESOURCE_DEFINITION>
            <RESOURCE_INSTANCE>MyCluster</RESOURCE_INSTANCE>
        </RESOURCE_DEFINITION>
        <DESIRED_STATE>Configured</DESIRED_STATE>
    </WHAT>
</LAW>
```

Figure 6A:
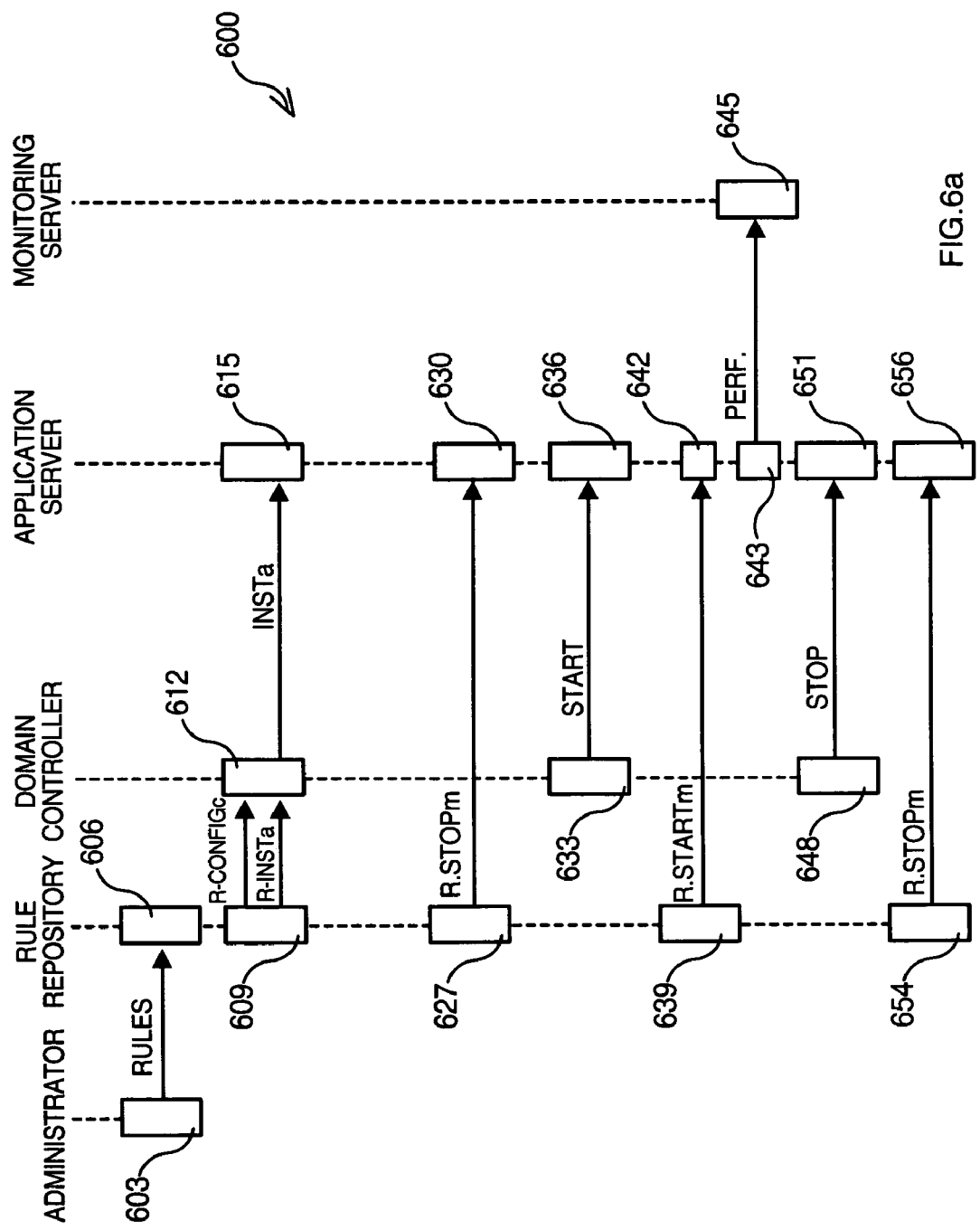

An exemplary scenario involved by the proposed monitoring on-demand solution is illustrated in the sequence diagram of FIGS. 6a-6b. The rules R_INSTa, R_STARTm, R_STOPm, R_INSTs and R_CONFIGc are defined by the authority at phase 603. The rules are then published into the rule repository at phase 606.

The rules R_CONFIGc and R_INSTa are retrieved at phase 609 by each subject classified as domain controller. The rule R_INSTa is then applied on the domain controller at phase 612. As a consequence, the desired distributed application is installed onto each WAS node of the cluster at phase 615. Since the distributed application is not running at the beginning, the rule R_STOPm is retrieved by each WAS node at phase 627; therefore, the monitoring agent is maintained non-running at phase 630.

Let us assume now that the domain controller at phase 633 decides to have the distributed application run on a specific WAS node (for example, because the workload of the cluster has increased). As a consequence, the distributed application is started at phase 636. The WAS node with the distributed application in the running condition now retrieves the rule R_STARTm at phase 639; the rule R_STARTm is then applied at phase 642, so as to install and start the monitoring agent as well. The monitoring agent measures performance parameters for the distributed application at phase 643, which performance parameters are collected by the monitoring server at phase 645.

Conversely, the domain controller can decide at phase 648 to have the distributed application no longer run on the WAS node (for example, because the workload of the cluster has decreased). As a consequence, the distributed application is stopped at phase 651. The WAS node with the distributed application in the non-running condition retrieves the rule R_STOPm again at phase 654; the rule R_STOPm is then applied at phase 656, so as to stop and remove the monitoring agent.

Referring now to the monitoring server, whenever a critical condition is detected the addition of a new WAS node to the cluster is required at phase 657. In response thereto, the administrator at phase 660 classifies a new subject as WAS node; in this way, the (dynamic logical) category of the new subject is updated accordingly at phase 663. The information is published into the membership data repository and then transmitted to the new WAS node at phase 664.

Therefore, the new WAS node retrieves the rule R_INSTs at phase 666. The rule R_INSTs is then applied on the new WAS node at phase 669, so as to install the application server. In addition, the domain controller associated with the formal parameter specified in the rule R_INSTs is identified by the membership data repository at block 672. The formal parameter is then resolved accordingly at block 675. As a consequence, the new WAS node at phase 678 declares itself to the domain controller. In response thereto, the domain controller is reconfigured at phase 681 so as to insert the application server of the new WAS node into the cluster. Therefore, the distributed application is installed on the new WAS node, and the same operations described above are then repeated.

However, the concepts of the present invention are also applicable when the monitoring on-demand solution is implemented with different rules (for example, with the installation and removal of the monitoring agent that are defined in two additional rules being a pre-requisite for the application of the rules R_STARTm and R_STOPm, respectively); similar considerations apply to different scenarios, which involve other operations (for example, when the distributed application is only stopped but not removed).

Alternatively, the rules R_STARTm and R_STOPm only start and stop, respectively, the execution of the monitoring agent; conversely, the monitoring agent is installed by applying a rule for a category defined by the clusters wherein the distributed application is installed and it is removed by applying a rule for a category defined by clusters wherein the distributed application is not installed. This solution, wherein the monitoring agent is enabled/disabled only by starting/stopping its execution (with different rules for the corresponding installation/removal) is advantageous when the monitoring agent consists of a relatively heavy program or when the cluster exhibits a very high dynamic (since it avoids overloading the cluster with the continual installation and removal of the monitoring agent). Conversely, the above-described solution wherein the enabling/disabling of the monitoring agent implies its installation/removal is advantageous otherwise (since it avoids having the monitoring agent installed when it is not necessary).

The proposed architecture implements an adaptive model, which can be compared to the behavior of the human society. In the human society a central authority (such as the parliament) enacts a series of laws for the citizens. Each law has a general character, and defines different provisions for corresponding categories of citizens. For example, a law decrees that each town council must appoint a committee for auditing the balance of any school in its district. The decision about the disposition of the schools is entrusted to the education ministry.

The parliament publishes the laws using an official bulletin; every citizen has the responsibility to remain up to date with the laws. In the example at issue, when the education ministry opens a new school, the corresponding town council appoints a committee; when the school is closed, the town council dissolves the committee. Therefore, the parliament does not need any information about the town councils or the actual disposition of the schools.

That solution clearly distinguishes from the enforcement model implemented by the resource management infrastructures known in the art. Referring again to the parallel with the civil society, let us consider a central authority consisting of a telephone company. Each new client wishing to use the services offered by the telephone company must fill in and return a form with all his/her personal data, in order to allow the telephone company to enable the required services. Conversely, when the client decides to disable one or more services, he/she must contact a call center of the telephone company. In this way, the telephone company controls the services provided to each client directly (according to the collected information).

In other words, the proposed model provides an autonomic computing implementation of the resource management infrastructure. The term autonomic comes from an analogy to the autonomic central nervous system in the human body, which adjusts to many situations automatically without any external help. Likewise, in the resource management infrastructure each subject is able to configure, tune and repair itself, as well as anticipate and solve performance problems automatically.

More generally, the present invention is intended to be used in a data processing system including a plurality of processing entities. The invention proposes a method of monitoring a distributed application, which is suitable to run on one or more of the processing entities. The method includes the step of surveying the processing entities to detect a change between a running condition and a non-running condition of the distributed application on each processing entity. A monitoring application for the distributed application is enabled on the processing entities where a change to the running condition has been detected; conversely, the monitoring application is disabled on the processing entities where a change to the non-running condition has been detected.

The solution of the invention implements a monitoring on-demand of the distributed application.

Particularly, this facilitates the monitoring of the distributed application in high-dynamic environments (wherein the arrangement of the distributed application changes continually).

This advantage is clearly perceived when the configuration of the distributed application changes at run-time.

In this case, the monitoring application only runs when it is necessary, thereby reducing any overload of the system.

The preferred embodiment of the invention described above offers further advantages.

The proposed solution is specifically designed for being implemented through a self-adaptive resource management infrastructure.

In this way, the different subjects are no longer passive entities, but they actively participate in the management process. As a consequence, the definition of the monitoring on-demand solution to be deployed in the system is strongly simplified. It should be noted that this result can be achieved reusing components already available in known resource management infrastructures (based on the enforcement model).

In a preferred embodiment, two rules are defined for enabling and disabling the monitoring application, respectively.

The proposed technique is very simple, but at the same time effective.

However, the implementation of the solution of the invention through a standard management infrastructure based on the enforcement model is not excluded (even if it is far less advantageous). For example, the monitoring on-demand can be controlled by agents that are enforced on the WAS nodes (which agents continually verify the condition of the distributed application, and start or stop the monitoring application in response to the switching of the distributed application to the running condition or to the non-running condition, respectively). Alternatively, a single rule is used to install the above-described agent on each WAS node, or the starting and stopping of the monitoring agent on the different WAS nodes is controlled remotely (through two corresponding rules for the domain controller).

As a further enhancement, the monitoring server causes one or more new subjects to be classified as WAS nodes in response to the detection of a critical condition; a further rule is defined for adding the new WAS nodes to the cluster.

In this way, the cluster self-adapts its composition according to the current workload.

Preferably, the rule for adding the new WAS nodes to the cluster includes a formal parameter for the domain controller.

The proposed feature allows defining the correlation with the desired domain controller at a logical level; the correlation is then resolved to the actual domain controller dynamically at run-time. This approach is very flexible, and further reduces the complexity of the monitoring on-demand solution.

Advantageously, a rule is defined for reconfiguring the domain controller whenever new WAS nodes are added to the cluster.

Therefore, the new WAS nodes are automatically recognized by the domain controller without any manual intervention.

In a particular embodiment of the invention, the enabling and disabling of the monitoring agent implies its installation and removal, respectively.

This solution is preferred with light monitoring agents.

Alternatively, the composition of the cluster is updated manually (in response to the critical condition), or the domain controlled is defined statically in the rule for adding new WAS nodes to the cluster; moreover, the domain controller can be reconfigured explicitly to recognize the new WAS nodes, or the enabling/disabling of the monitoring agent can only involve its starting/stopping. In any case, the use of the proposed monitoring on-demand solution in a generic distributed data processing system (wherein the processing entities on which the distributed application can run are not organized into a cluster) is not excluded.

Advantageously, the solution according to the present invention is implemented with a computer program, which is provided as a corresponding product stored on a suitable medium.

Alternatively, the program is pre-loaded onto the hard-disks, is sent to the computers through the INTERNET, is broadcast, or more generally is provided in any other form directly loadable into the working memories of the computers. However, the method according to the present invention leads itself to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims

The invention claimed is:

1. In a data processing system including a plurality of processing entities, a method of monitoring a distributed application suitable to run on at least one of the processing entities, the method including the steps of:

surveying the processing entities to detect a change between a running condition and a non-running condition of the distributed application on each processing entity, responsive to detecting a change from the non-running condition to the running condition, enabling a monitoring application for monitoring performance of the distributed application on each of the processing entities where the change to the running condition has been detected, responsive to detecting a change from the running condition to the non-running condition, disabling the monitoring application on each of the processing entities where the change to the non-running condition has been detected, wherein the processing entities are grouped into a cluster being controlled by a controller entity that automatically performs the surveying, enabling and disabling steps for each of the processing entities without user intervention, wherein the controller entity installs the distributed application on the processing entities that are grouped into the cluster;

an authority entity publishing a plurality of rules each one defining a target state for a category of subjects, wherein the plurality of rules are published to a common rule repository, wherein:

(i) the authority entity publishing a first rule to the common rule repository for a first category defined by the subjects having the distributed application in the running condition, the target state of the first rule specifying the enabling of the monitoring application, and a second rule to the common rule repository for a second category defined by the subjects having the distributed application in the non-running condition, the target state of the second rule specifying the disabling of the monitoring application, each processing entity having the distributed application in the running condition self-applies the first rule to itself to enable the monitoring application, wherein the first rule is self-applied in response to the distributed application being placed in the running condition by the controller entity, and each processing entity having the distributed application in the non-running condition self-applies the second rule to itself to disable the monitoring application, wherein the second rule is self-applied in response to the distributed application being placed in the non-running condition by the controller entity;

(ii) the authority entity publishing a third rule to the common rule repository for a third category defined by the subjects classified as processing entities, the target state of the third rule specifying the addition of the processing entity to the cluster, each enabled monitoring application sending monitoring information to a collector entity, the collector entity detecting a critical condition according to the monitoring information, the collector entity causing at least one new subject to be automatically classified without user intervention as a new processing entity in response to the critical condition, and each new processing entity applying the third rule in order to be added to the cluster, wherein the third rule includes a formal parameter defining a correlation with a fourth category defined by the subjects classified as controller entities, the step of applying the third rule including: retrieving the third rule from the common rule repository, identifying the subject belonging to the fourth category, and resolving the formal parameter into the identified subject to thereby identify the controller entity that controls the cluster that the each new processing entity is added to;

(iii) the authority entity publishing a fourth rule to the common rule repository for the fourth category, the target state of the fourth rule specifying the reconfiguration of the cluster in response to the addition of each new processing entity to the cluster, and the controller entity applying the fourth rule to reconfigure the cluster in order to account for the addition of each new processing entity to the cluster; and each subject, which is a given processing entity of the processing entities, reading directly from the common rule repository and applying each rule for the corresponding category to configure the subject according to the target state defined in the rule.

2. The method according to claim 1, wherein the step of enabling the monitoring application includes installing and starting the monitoring application on the processing entity by the controller entity, and wherein the step of disabling the monitoring application includes stopping and removing the monitoring application from the processing entity by the controller entity.

3. In a data processing system including a plurality of processing entities, a computer program including program code means directly loadable into a working memory of the system for performing a method of monitoring a distributed application suitable to run on at least one of the processing entities when the program is run on the system, the method including the steps of:

surveying the processing entities to detect a change between a running condition and a non-running condition of the distributed application on each processing entity, responsive to detecting a change from the non-running condition to the running condition, enabling a monitoring application for monitoring performance of the distributed application on each of the processing entities where the change to the running condition has been detected, and responsive to detecting a change from the running condition to the non-running condition, disabling the monitoring application on each of the processing entities where the change to the non-running condition has been detected, wherein the processing entities are grouped into a cluster being controlled by a controller entity that automatically performs the surveying, enabling and disabling steps for each of the processing entities without user intervention, wherein the controller entity installs the distributed application on the processing entities that are grouped into the cluster:

an authority entity publishing a plurality of rules each one defining a target state for a category of subjects, wherein the plurality of rules are published to a common rule repository, wherein:

(i) the authority entity publishing a first rule to the common rule repository for a first category defined by the subjects having the distributed application in the running condition, the target state of the first rule specifying the enabling of the monitoring application, and a second rule to the common rule repository for a second category defined by the subjects having the distributed application in the non-running condition, the target state of the second rule specifying the disabling of the monitoring application, each processing entity having the distributed application in the running condition self-applies the first rule to itself to enable the monitoring application, wherein the first rule is self-applied in response to the distributed application being placed in the running condition by the controller entity, and each processing entity having the distributed application in the non-running condition self-applies the second rule to itself to disable the monitoring application, wherein the second rule is self-applied in response to the distributed application being placed in the non-running condition by the controller entity;

(ii) the authority entity publishing a third rule to the common rule repository for a third category defined by the subjects classified as processing entities, the target state of the third rule specifying the addition of the processing entity to the cluster, each enabled monitoring application sending monitoring information to a collector entity, the collector entity detecting a critical condition according to the monitoring information, the collector entity causing at least one new subject to be automatically classified without user intervention as a new processing entity in response to the critical condition, and each new processing entity applying the third rule in order to be added to the cluster, wherein the third rule includes a formal parameter defining a correlation with a fourth category defined by the subjects classified as controller entities, the step of applying the third rule including: retrieving the third rule from the common rule repository, identifying the subject belonging to the fourth category, and resolving the formal parameter into the identified subject to thereby identify the controller entity that controls the cluster that the each new processing entity is added to;

(iii) the authority entity publishing a fourth rule to the common rule repository for the fourth category, the target state of the fourth rule specifying the reconfiguration of the cluster in response to the addition of each new processing entity to the cluster, and the controller entity applying the fourth rule to reconfigure the cluster in order to account for the addition of each new processing entity to the cluster; and each subject, which is a given processing entity of the processing entities, reading directly from the common rule repository and applying each rule for the corresponding category to configure the subject according to the target state defined in the rule.

4. In a data processing system including a plurality of processing entities, a program product including a computer readable medium embodying a computer program, the computer program being directly loadable into a working memory of the system for performing a method of monitoring a distributed application suitable to run on at least one of the processing entities when the program is run on the system, the method including the steps of:

surveying the processing entities to detect a change between a running condition and a non-running condition of the distributed application on each processing entity, responsive to detecting a change from the non-running condition to the running condition, enabling a monitoring application for monitoring performance of the distributed application on each of the processing entities where the change to the running condition has been detected, and responsive to detecting a change from the running condition to the non-running condition, disabling the monitoring application on each of the processing entities where the change to the non-running condition has been detected, wherein the processing entities are grouped into a cluster being controlled by a controller entity that automatically performs the surveying, enabling and disabling steps for each of the processing entities without user intervention, wherein the controller entity installs the distributed application on the processing entities that are grouped into the cluster;

an authority entity publishing a plurality of rules each one defining a target state for a category of subjects, wherein the plurality of rules are published to a common rule repository, wherein:

(i) the authority entity publishing a first rule to the common rule repository for a first category defined by the subjects having the distributed application in the running condition, the target state of the first rule specifying the enabling of the monitoring application, and a second rule to the common rule repository for a second category defined by the subjects having the distributed application in the non-running condition, the target state of the second rule specifying the disabling of the monitoring application, each processing entity having the distributed application in the running condition self-applies the first rule to itself to enable the monitoring application, wherein the first rule is self-applied in response to the distributed application being placed in the running condition by the controller entity, and each processing entity having the distributed application in the non-running condition self-applies the second rule to itself to disable the monitoring application, wherein the second rule is self-applied in response to the distributed application being placed in the non-running condition by the controller entity;

(ii) the authority entity publishing a third rule to the common rule repository for a third category defined by the subjects classified as processing entities, the target state of the third rule specifying the addition of the processing entity to the cluster, each enabled monitoring application sending monitoring information to a collector entity, the collector entity detecting a critical condition according to the monitoring information, the collector entity causing at least one new subject to be automatically classified without user intervention as a new processing entity in response to the critical condition, and each new processing entity applying the third rule in order to be added to the cluster, wherein the third rule includes a formal parameter defining a correlation with a fourth category defined by the subjects classified as controller entities, the step of applying the third rule including: retrieving the third rule from the common rule repository, identifying the subject belonging to the fourth category, and resolving the formal parameter into the identified subject to thereby identify the controller entity that controls the cluster that the each new processing entity is added to;

(iii) the authority entity publishing a fourth rule to the common rule repository for the fourth category, the target state of the fourth rule specifying the reconfiguration of the cluster in response to the addition of each new processing entity to the cluster, and the controller entity applying the fourth rule to reconfigure the cluster in order to account for the addition of each new processing entity to the cluster; and each subject, which is a given processing entity of the processing entities, reading directly from the common rule repository and applying each rule for the corresponding category to configure the subject according to the target state defined in the rule.

5. In a data processing system including a plurality of processing entities, a system for monitoring a distributed application suitable to run on at least one of the processing entities, the system including:

means for surveying the processing entities to detect a change between a running condition and a non-running condition of the distributed application on each processing entity, means, responsive to detecting a change from the non-running condition to the running condition, for enabling a monitoring application for monitoring performance of the distributed application on each of the processing entities where the change to the running condition has been detected, and means, responsive to detecting a change from the running condition to the non-running condition, for disabling the monitoring application on each of the processing entities where the change to the non-running condition has been detected, wherein the processing entities are grouped into a cluster being controlled by a controller entity that includes the means for surveying, means for enabling and means for disabling for each of the processing entities, wherein the controller entity installs the distributed application on the processing entities that are grouped into the cluster;

an authority entity publishing a plurality of rules each one defining a target state for a category of subjects, wherein the plurality of rules are published to a common rule repository, wherein:

(i) the authority entity publishing a first rule to the common rule repository for a first category defined by the subjects having the distributed application in the running condition, the target state of the first rule specifying the enabling of the monitoring application, and a second rule to the common rule repository for a second category defined by the subjects having the distributed application in the non-running condition, the target state of the second rule specifying the disabling of the monitoring application, each processing entity having the distributed application in the running condition self-applies the first rule to itself to enable the monitoring application, wherein the first rule is self-applied in response to the distributed application being placed in the running condition by the controller entity, and each processing entity having the distributed application in the non-running condition self-applies the second rule to itself to disable the monitoring application, wherein the second rule is self-applied in response to the distributed application being placed in the non-running condition by the controller entity;

(ii) the authority entity publishing a third rule to the common rule repository for a third category defined by the subjects classified as processing entities, the target state of the third rule specifying the addition of the processing entity to the cluster, each enabled monitoring application sending monitoring information to a collector entity, the collector entity detecting a critical condition according to the monitoring information, the collector entity causing at least one new subject to be automatically classified without user intervention as a new processing entity in response to the critical condition, and each new processing entity applying the third rule in order to be added to the cluster, wherein the third rule includes a formal parameter defining a correlation with a fourth category defined by the subjects classified as controller entities, the step of applying the third rule including: retrieving the third rule from the common rule repository. identifying the subject belonging to the fourth category, and resolving the formal parameter into the identified subject to thereby identify the controller entity that controls the cluster that the each new processing entity is added to;

(iii) the authority entity publishing a fourth rule to the common rule repository for the fourth category, the target state of the fourth rule specifying the reconfiguration of the cluster in response to the addition of each new processing entity to the cluster, and the controller entity applying the fourth rule to reconfigure the cluster in order to account for the addition of each new processing entity to the cluster; and each subject, which is a given processing entity of the processing entities, comprising means for reading directly from the common rule repository and applying each rule for the corresponding category to configure the subject according to the target state defined in the rule.

* * * * *